(12) United States Patent
Blanchard et al.

(10) Patent No.: US 7,891,073 B2
(45) Date of Patent: Feb. 22, 2011

(54) METHOD OF ASSEMBLING TWO PARTS, AT LEAST ONE OF WHICH IS MADE OF A COMPOSITE, AND INSERT FOR CARRYING OUT THE ASSEMBLY

(75) Inventors: Stephane Pierre Guillaume Blanchard, Chartrettes (FR); Yann Vuillemenot, Paris (FR)

(73) Assignee: SNECMA, Paris (FR)

( * ) Notice: Subject to any disclaimer, the term of this patent is extended or adjusted under 35 U.S.C. 154(b) by 1306 days.

(21) Appl. No.: 11/279,811

(22) Filed: Apr. 14, 2006

(65) Prior Publication Data

US 2006/0231586 A1  Oct. 19, 2006

(30) Foreign Application Priority Data

Apr. 15, 2005  (FR) .................................. 05 50966

(51) Int. Cl.
*B23P 11/00* (2006.01)
*A47J 36/02* (2006.01)

(52) U.S. Cl. .................................... 29/525.01; 228/101

(58) Field of Classification Search ............. 29/525.01, 29/525.04, 525.11, 525.12, 428, 434; 228/101; 415/170.1
See application file for complete search history.

(56) References Cited

U.S. PATENT DOCUMENTS 5,327,814 A    7/1994  Custer et al.

FOREIGN PATENT DOCUMENTS

EP   1 024 301 A2   8/2000
FR   2 865 502      7/2005

OTHER PUBLICATIONS

U.S. Appl. No. 12/670,786, filed Jan. 26, 2010, Dunleavy, et al.
U.S. Appl. No. 12/670,767, filed Jan. 26, 2010, Dunleavy, et al.

*Primary Examiner*—John C Hong
(74) *Attorney, Agent, or Firm*—Oblon, Spivak, McClelland, Maier & Neustadt, L.L.P.

(57) ABSTRACT

A method for bonding a first part made of a composite to a second part to a predetermined dimension is disclosed. The method includes placing an insert into the first part, a first surface of the insert protruding beyond the predetermined dimension; machining the insert until the first surface is at the predetermined dimension; placing the second part on the insert; and fastening the second part via the insert. The use of an insert makes it possible to produce, with high precision, a reproducible assembly, which can still be dismantled.

11 Claims, 2 Drawing Sheets

METHOD OF ASSEMBLING TWO PARTS, AT LEAST ONE OF WHICH IS MADE OF A COMPOSITE, AND INSERT FOR CARRYING OUT THE ASSEMBLY

BACKGROUND OF THE INVENTION

The invention relates to the field of composites and to their application in particular in aeronautical turbomachines.

In the aeronautical field in particular, a constant objective is to produce parts of great mechanical strength in an unfavorable environment for a minimal weight and size. Thus, certain parts are produced from a ceramic matrix composite (CMC), such as for example an SiC/SiC composite produced for applications of long duration at high temperatures. Such a composite consists of a multidirectional reinforcement made of silicon carbide and a matrix, also made of silicon carbide. The latter gives the composite exceptional thermomechanical fatigue resistance, in an oxidizing environment, at temperatures possibly up to 1400° C. These composites are currently used for the manufacture of aircraft engine parts, namely nozzle flaps, combustion chamber and reheat system. It is the fibers that take up the loads, the matrix providing a function of binder for the rest of the part and of protecting and isolating the fibers, which must not come into contact with the oxidizing atmosphere.

The difficulties of integrating a composite, in particular a CMC, in any environment are connected with its manufacturing tolerances: the geometrical envelope of this composite may vary up to ±0.55 mm in thickness.

When such a part is to be assembled with another part made of a CMC or a metal, the practice hitherto has been to use the technique of matching. However, with this technique it is not possible to dimension the parts separately —it is the assembly that is dimensioned. Used in development, this method cannot be economically transposed to mass production. In particular, matching eliminates interchangeability of the parts, since no unique definition exists. In addition, matching is an expensive method both in terms of production and after-sales service for spares.

BRIEF SUMMARY OF THE INVENTION

The subject of the invention is therefore a method for joining, with high precision, a first part made of a composite, especially of the CMC (ceramic matrix composite) type having itself a relatively high manufacturing tolerance, to a second part, while still allowing possible replacement of the second part, for example within the context of a repair.

This objective can be achieved with a method for bonding a first part made of a ceramic matrix composite to a second part, to a defined dimension, wherein an insert is fitted onto said first part, said insert protruding beyond said dimension, the insert is machined until its surface is at said defined dimension, said second part is placed on the insert and the second part is fastened via the insert.

Thanks to the use of a preferably metal insert, which can thus be machined with high precision, it is possible, in a very simple and inexpensive manner, to position the second part relative to the first at the desired dimension. There would be a risk of impairing the properties of the composite if the matrix of the composite were to be machined, possibly directly, over a large portion of the bearing surface between the two parts, this operation baring the fibers.

More precisely, a housing is drilled out in the first part in order to house the insert therein. Advantageously, an insert with a cylindrical portion and a shoulder is used, the insert is placed via its cylindrical portion in the housing as far as its shoulder, and the insert is fastened by means of a washer that is brazed to the face on the opposite side from the shoulder. This way of fixing the insert in the housing of the first part allows optimum preservation of material without any risk of corrosion. In particular, a brazing temperature above the operating temperature is chosen. Thus, as the metal insert expands more strongly than the CMC composite, it is sufficient to install and fit the washer hot. The metal, on cooling, contracts and the CMC plate is pinched between the washer and the shoulder upon cooling, or in operation, down to a temperature below the brazing temperature.

Depending on the application, that portion of the insert with the shoulder and/or the cylindrical portion of the insert are machined.

Preferably, the second part is fastened to the first part by means of a rivet, a welded stud or a bolt that passes through the insert along the axis of the cylindrical portion.

The subject of the invention is also an insert for implementing the method, in which a first part of defined thickness is bonded to a second part to a defined assembly dimension. The insert is one in which the cylindrical portion is of greater height than the thickness of the first part, the shoulder having a protrusion that can be machined off. Advantageously, the insert has a central bore passing through the cylindrical portion and the shoulder. More particularly, the shoulder has a clamping means for immobilizing the insert during the machining operation.

BRIEF DESCRIPTION OF THE DRAWINGS

The invention will now be described in detail with reference to the appended drawings in which.

DETAILED DESCRIPTION OF THE INVENTION

Figure 1:
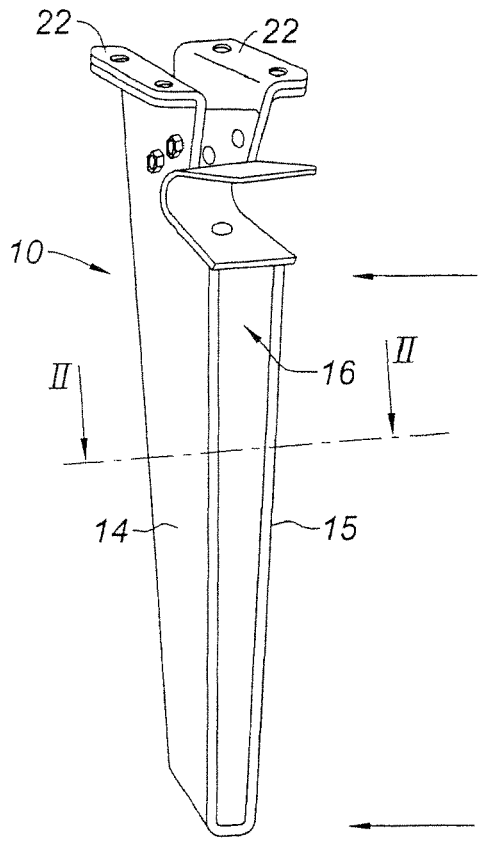
FIG. 1 shows, in perspective, a flame holder arm of an afterburner device in a turbojet.
Figure 2:
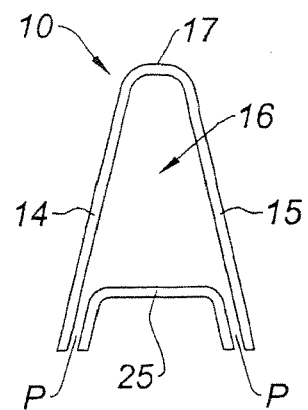
FIG. 2 is a sectional view along the direction II-II of the arm of FIG. 1.

FIG. 1 shows, as does FIG. 2 in cross section, a flame holder arm 10, as used in an afterburner system of a turbojet. This arm is made of a composite as described in patent application FR 04/00651 filed by the Applicant. The composite, of the CMC type, allows a one-piece structure to be produced, here with a V-shape with two walls 14 and 15 diverging from each other from an edge 17. The arm includes two flanges 20 and 22 for fixing to the external casing of the afterburner channel. The elongate cavity 16, provided between the two walls and turned toward the downstream of the channel, serves for delivering an air/fuel mixture into the stream of the primary flow. A cover or screen 25, shown in exploded view in FIG. 1, partially closes off the cavity 16, while still leaving a peripheral space P through which the fuel mixture is injected into the gas stream. It is important to have a precise assembly since the gap between the walls 14 and 15 of the arm and those of the cap 25 controls the flow rate of the mixture. A problem therefore arises owing to the nature of the composite from which the components are made. It is not possible to compensate for the geometrical variations in the part by machining the composite in order to adjust the position of one part relative to the other because of the risk of fiber corrosion when the working temperature of the part is above 300° C. Moreover, an assembly using a matching technique would not permit a repair to be made with a replacement for one element, since the dimensions would be lost.

According to the invention, the geometrical variations of the composite are compensated for by means of an insert made of metal or equivalent, which can be machined to the desired dimension. This insert fastened to the composite part provides reproducible geometric boundaries and permits one element to be easily replaced with a spare part.

The invention is not limited to assembling an element on a flame holder arm of an afterburner system, but to assembling all parts where one is made of a composite, especially of the CMC type, which require precise adjustment and can be repaired by part replacement.

Figure 3:
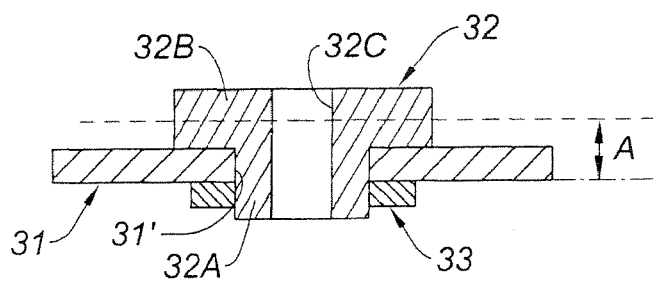
FIG. 3 is a sectional partial view of a first part to be assembled with an insert according to the invention.
Figure 4:
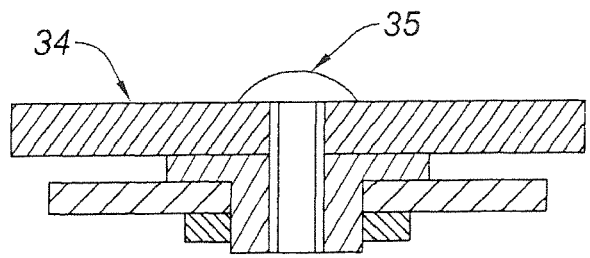
FIG. 4 shows the two parts assembled in accordance with the invention.

FIGS. 3 and 4 show one method of assembly according to the invention.

The aim is to assemble a first part 31, made of a CMC-type composite, to a second part 34, which may also be of the CMC type or simply made of metal. If the second part is also made of a CMC, it may be advantageous to mount a second machinable insert on the second part, the contact taking place between the two machined surfaces of the two inserts.

As may be seen in FIG. 3, the part 31 has a portion of defined thickness, which constitutes the region in which it is fastened to the second part 34. An insert 32 is housed in a hole drilled in the part 31. The insert 32 consists of a cylindrical portion 32A and a portion with a shoulder 32B. The cylindrical portion is housed in the drill hole 31' of the part and is long enough to emerge on the opposite side from the shoulder of the portion 32B. A washer 33 is brazed onto the free portion of the cylindrical element 32A. The part 31 is thus held clamped between the washer and the shoulder 32B. The thickness E of the shouldered element 32B of the insert is chosen so that its free face is higher than the level A. This level A is that of the desired dimension. Here this dimension is defined with respect to that face of the part 31 on the opposite side from the shoulder 32B. The dimension could be defined with respect to another reference.

The procedure is as follows:

a drill hole 31' is machined in the part 31 so as to be able to house the portion 32A of the insert 32. Where appropriate, that is to say when it is desired to avoid any risk of fiber corrosion in operation, the edges of the drilled region are treated so as to reconstitute a matrix for protecting the fibers of the composite. It may be seen that it would not be possible to proceed in the same way on a bearing surface, since the reconstituted matrix on a surfaced region to a precise dimension would not be of constant thickness, hence the benefit of the insert.

The insert 32 is placed in the drill hole and a washer 33 is brazed onto its free edge, for example by means of a braze. The materials used for the insert and the braze are for example a cobalt-based alloy such as HS25 or L605. This material would be used both for a cold application (for example for the top of the arm in the example considered here) and for a hot application (for that part of the arm swept by the primary flow).

Brazing is preferred to welding so as to limit the stresses of thermal origin in the CMC part during assembly.

FIG. 4 shows the two parts bonded together according to the invention. The insert has been machined to the dimension A and the second part brought into contact with the machined face of the insert. This second part may be made of a composite like the first, or else it may be made of metal. The bonding is obtained here by riveting through the bore 32C made through the insert 32. The rivet 35 clamps the two free opposed faces together, one being that of the part 34 and the other being that of the cylindrical portion 32A of the insert.

Thus, thanks to the solution of the invention, it is possible to assemble two parts 31 and 34 with high precision independently of the thickness tolerances of one or other of the two parts. Moreover, this assembly can be easily dismantled. It is possible to replace the part 34 with another, depending on the case, since the dimension defined by the machined insert is maintained.

Figure 5:
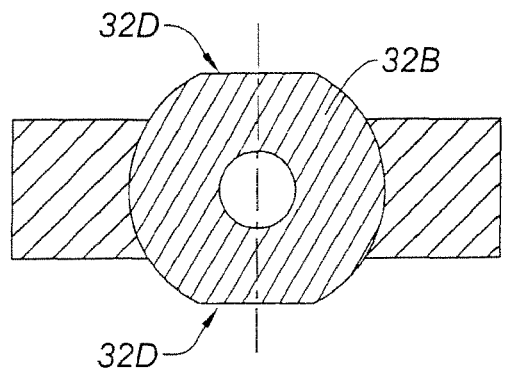
FIG. 5 shows one embodiment of the insert, seen from above.

FIG. 5 shows one embodiment of the insert. The shouldered portion 32B in this embodiment has two flaps 32D machined parallel to each other along the axis of the cylindrical portion 32A. The function of this means is to install a system for clamping the insert while it is being machined to the required dimension.

Figure 6:
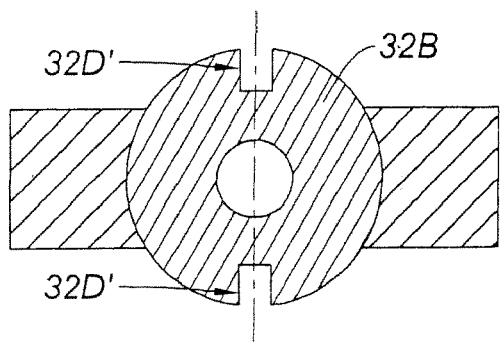
FIG. 6 shows another embodiment of the insert.

FIG. 6 shows another embodiment, differing from that in FIG. 5. This has two notches 32D' in which a clamping tool engages during the machining operation for bringing the insert to the required dimension.

Figure 7:
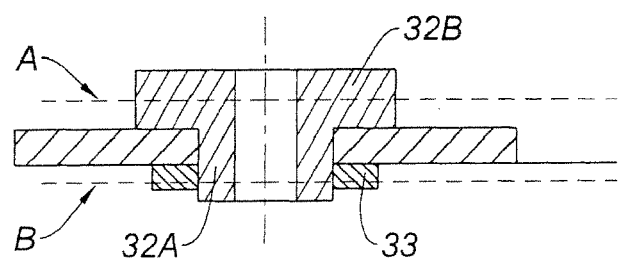
FIGS. 7 and 8 show another application of the assembly method according to the invention.
Figure 8:
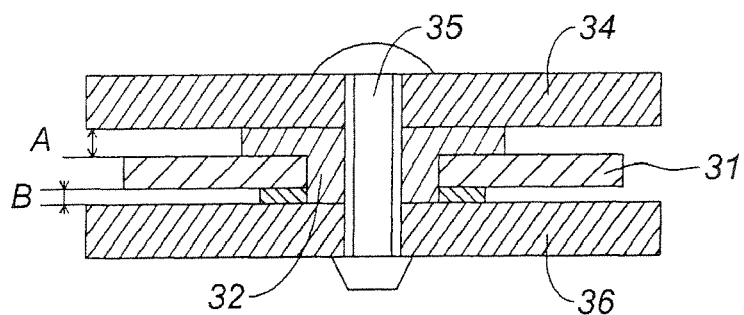

FIGS. 7 and 8 illustrate the implementation of the invention within the context of another application. In this case a first part 31 is to be assembled with a second part 34 and a third part 36. The first part 31 is assembled with the second part 34 to the dimension A and the first part 31 assembled with the third part 36 to the dimension B. For this purpose, an insert 32 is used in which the cylindrical portion 32A and the shouldered portion 32B each have a material allowance sufficient for them to be able to be machined to the desired dimension A and B respectively. A single rivet bonds the three parts together.

The invention claimed is:

1. A method for bonding a first part made of a ceramic matrix composite to a second part to create an assembly, the method comprising:

drilling a hole in said first part;

placing an insert into said first part along an axis of the hole, a first surface of said insert protruding beyond a predetermined dimension between the first surface of the insert and a first surface of the first part in a direction parallel to the axis of the hole;

machining the first surface of the insert until a distance between the first surface of the insert and the first surface of the first part in the direction parallel to the axis of the hole is the predetermined dimension;

placing the second part on the first surface of the insert; and fastening the second part via the insert.

2. The method as claimed in claim 1, wherein the insert includes a cylindrical portion and a portion with a shoulder, the cylindrical portion of the insert is placed in the hole such that the shoulder abuts a second surface of the first part, the second surface of the first part is opposite the first surface of the first part, and the insert is fastened by a washer that is brazed to the first surface of the first part.

3. The method as claimed in claim 2, wherein the brazing temperature is above the operating temperature of the assembly so that the insert pinches on the first part.

4. The method as claimed in claim 2, wherein at least one of the portion of the insert with the shoulder or the cylindrical portion of the insert is machined.

5. The method as claimed in claim 2, wherein the second part is fastened to the first part by a rivet, a welded stud or a bolt passing through the insert along an axis of the cylindrical portion.

6. The method as claimed in claim 2, wherein the insert comprises a first part of defined thickness is bonded to a second part to a defined dimension, wherein the cylindrical portion is of greater height than the thickness of the first part, the shoulder having a protrusion that can be machined off.

7. The method as claimed claim 6, wherein the insert further comprises a central bore passing through the cylindrical portion and the shoulder.

8. The method as claimed in claim 1, further comprising assembling a third part via the insert.

9. The method as claimed in claim 2, wherein the shoulder includes a clamping means for immobilizing the insert during the machining operation.

10. The method as claimed in claim 2, further comprising machining two flaps that are parallel to each other on the shoulder of the insert.

11. The method as claimed in claim 2, further comprising machining two notches in the shoulder of the insert.

* * * * *